US011779106B2

(12) United States Patent
O'Hara et al.

(10) Patent No.: US 11,779,106 B2
(45) Date of Patent: Oct. 10, 2023

(54) MULTI-PLACE DINING TABLE FOR A VEHICLE

(71) Applicant: Gulfstream Aerospace Corporation, Savannah, GA (US)

(72) Inventors: Timothy O'Hara, Savannah, GA (US); Joe Guthrie, Savannah, GA (US); Matthew Dixon, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 64 days.

(21) Appl. No.: 17/451,143

(22) Filed: Oct. 15, 2021

(65) Prior Publication Data

US 2022/0117389 A1 Apr. 21, 2022

Related U.S. Application Data

(60) Provisional application No. 63/198,437, filed on Oct. 19, 2020.

(51) Int. Cl.
| | | |
|---|---|---|
| *A47B 5/00* | (2006.01) | |
| *B64D 11/06* | (2006.01) | |
| *A47B 5/04* | (2006.01) | |
| *A47B 5/06* | (2006.01) | |

(52) U.S. Cl.
CPC .............. *A47B 5/006* (2013.01); *A47B 5/04* (2013.01); *A47B 5/06* (2013.01); *B64D 11/0605* (2014.12); *B64D 11/0638* (2014.12)

(58) Field of Classification Search
CPC ....... A47B 5/006; A47B 5/04; B64D 11/0605; B64D 11/0638

USPC ..... 244/118.6, 188.5, 129.1; 296/37.14, 156, 296/164
See application file for complete search history.

(56) References Cited

U.S. PATENT DOCUMENTS

| | | | |
|---|---|---|---|
| 5,947,416 A | 9/1999 | Kraft | |
| 7,506,923 B1 | 3/2009 | Gauss | |
| 2009/0146005 A1* | 6/2009 | Bettell | B64D 11/0643 244/118.6 |

(Continued)

FOREIGN PATENT DOCUMENTS

| | | | | |
|---|---|---|---|---|
| CA | 2634914 A1 * | 6/2007 | ............ | B64D 11/06 |
| EP | 1636087 B1 | 4/2007 | | |

(Continued)

*Primary Examiner* — Jose V Chen
(74) *Attorney, Agent, or Firm* — LKGlobal | Lorenz & Kopf, LLP (57) ABSTRACT

Vehicles and multi-place dining tables for vehicles are provided. In one example, the vehicle includes a vehicle structure having a first sidewall, a second sidewall, and a floor disposed therebetween. The vehicle structure at least partially surrounds an interior area that has an aisleway extending therethrough. A multi-place dining table is disposed in the interior area and includes a first table section that is disposed between the first sidewall and the aisleway. The first table section includes a first tabletop. A second table section is disposed between the second sidewall and the aisleway and includes a second tabletop. The second tabletop is movable between a stowed position where the first and second tabletops are spaced apart from each other by at least the aisleway and a deployed position where the second tabletop extends across the aisleway and is coupled to the first tabletop.

20 Claims, 12 Drawing Sheets

(56) References Cited

U.S. PATENT DOCUMENTS

| | | | |
|---|---|---|---|
| 2010/0187357 A1 | 7/2010 | Funke et al. | |
| 2010/0193634 A1* | 8/2010 | Hankinson | B64D 11/06 244/118.6 |
| 2015/0158400 A1* | 6/2015 | Yin | B60N 2/753 297/67 |
| 2015/0284088 A1* | 10/2015 | Gow | B64D 11/0605 108/44 |
| 2016/0297524 A1* | 10/2016 | Simeon | B64D 11/0601 |
| 2017/0057639 A1* | 3/2017 | Bang | A47B 13/10 |
| 2017/0327232 A1* | 11/2017 | Morgan | B64D 11/0606 |
| 2018/0281961 A1* | 10/2018 | Mariat | B64D 11/0638 |
| 2018/0281966 A1* | 10/2018 | Chuang | A47B 46/00 |
| 2018/0354398 A1* | 12/2018 | Lamb | F16M 11/041 |
| 2019/0241269 A1* | 8/2019 | Martin | B64D 11/0604 |
| 2020/0130838 A1* | 4/2020 | Beaudin | G06F 3/017 |
| 2020/0355005 A1* | 11/2020 | Kuyper | E05D 3/186 |
| 2020/0369387 A1* | 11/2020 | Yaghoubi | B64D 11/0604 |
| 2021/0114731 A1* | 4/2021 | Guthrie | B64D 11/0643 |
| 2021/0221514 A1* | 7/2021 | Dowty | B64D 11/0641 |
| 2021/0307548 A1* | 10/2021 | Raghoonandan | A47G 23/0225 |
| 2021/0380254 A1* | 12/2021 | Woodington | B64D 11/0602 |
| 2022/0033083 A1* | 2/2022 | Chareyre | B64D 11/0638 |

FOREIGN PATENT DOCUMENTS

| | | |
|---|---|---|
| EP | 2627560 B1 | 7/2015 |
| WO | 2020065306 A1 | 4/2020 |

\* cited by examiner

MULTI-PLACE DINING TABLE FOR A VEHICLE

CROSS-REFERENCE TO RELATED APPLICATIONS

This application is related to and claims all available benefit of U.S. Provisional Patent Application 63/198,437 filed Oct. 19, 2020, the entire contents of which are herein incorporated by reference.

TECHNICAL FIELD

The technical field relates generally to tables for vehicles, and more particularly, relates to multi-place dining tables for vehicles, for example aircraft or the like.

BACKGROUND

Providing adequate and practical tables for dining and/or other activities is of particular interest for many vehicle manufacturers. For example, in an aircraft, it is desirable to provide a dining table for passengers and/or other occupants for meals, snacks, and/or other activities during a flight. However, space is limited and providing a dining table on board an aircraft for accommodating multiple people, for example up to six persons, consumes a significant amount of cabin space during non-mealtimes.

Accordingly, it is desirable to provide a multi-place dining table for a vehicle that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a vehicle and a multi-place dining table for a vehicle are provided herein.

In a first non-limiting embodiment, the vehicle includes, but is not limited to, a vehicle structure having a first sidewall and a second sidewall that are spaced apart from each other, and a floor disposed therebetween. The first sidewall, the second sidewall, and the floor at least partially surround an interior area that has an aisleway extending therethrough. The vehicle further includes, but is not limited to, a multi-place dining table that is disposed in the interior area. The multi-place dining table includes a first table section that is disposed between the first sidewall and the aisleway and that includes a first tabletop. A second table section is disposed between the second sidewall and the aisleway and includes a second tabletop. The second tabletop is configured to move between a stowed position and a deployed position. When the second tabletop is in the stowed position, the first and second tabletops are spaced apart from each other by at least the aisleway. When the second tabletop is in the deployed position, the second tabletop extends across the aisleway and is coupled to the first tabletop.

In another non-limiting embodiment, the multi-place dining table includes, but is not limited to, a first table section that is configured to be disposed between the first sidewall and the aisleway. The first table section includes a first tabletop. The multi-place dining table further includes, but is not limited to, a second table section that is configured to be disposed between the second sidewall and the aisleway. The second table section includes a second tabletop. The second tabletop is configured to move between a stowed position and a deployed position. When the second tabletop is in the stowed position, the first and second tabletops are spaced apart from each other by at least the aisleway. When the second tabletop is in the deployed position, the second tabletop extends across the aisleway and is coupled to the first tabletop.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

The exemplary embodiments taught herein provide a dining table for a vehicle, such as, for example, an aircraft. The dining table, when desired, can be assembled into a multi-place dining table, for example to accommodate up to six persons or more and can be disassembled and "put-away" at non-mealtimes so as to minimally occupy cabin space. In an exemplary embodiment, the multi-place (e.g., six place) dining table includes three distinct table sections. The first table section includes, for example, a four place table that can function independently as a four place table. The four place table has a tabletop including an integrated leaf(s) or sub-section(s) that can be extended and retracted (e.g., unfolded and folded).

The second table section can be integrated with an ottoman or trim piece to help conceal its presence in the aircraft cabin. The second table section includes, for example, a two place table that can function independently as a two place table. When the multi-place (e.g., six place) table is desired, the ottoman or trim piece may be removed, and the second table section is exposed at a suitable table height and is rotated and deployed into position so that its tabletop including any subsection(s) couple with the tabletop of the first table section including the extended leaf(s).

The third table section includes a leaf that is housed vertically adjacent to the wall of the vehicle cabin (e.g., aircraft cabin). When the third table section is needed for the multi-place table (e.g., six place table), the leaf is removed from a stowage space and moved into a horizontal position adjacent to the deployed tabletop of the second table section. The third table section is coupled to an interior structure/surface adjacent to the cabin wall and moves back and forth between a deployed position and a retracted position on a linkage configured to accommodate such movement. When the tabletop including the deployed leaf(s) of the first table section is disposed adjacent to the deployed tabletop of the second table section and when the deployed leaf of the third table section is disposed adjacent with the deployed tabletop of the second table section, the three table sections cooperate to form a seemingly integral multi-place (e.g., six place) dining table.

In an exemplary embodiment, the first and the second table sections each contain a leaf(s) or sub-section(s) that fold(s) over on top of one another to permit the section to have a smaller profile for storage and a larger profile when deployed. Once the need for the multi-place table (e.g., six place table) has ended, the leaves or sub-sections of the first table section, the second table section, and the third table section can all be returned back to their initial positions. The ottoman or trim piece is then returned to its position about the second table section.

Figure 1:
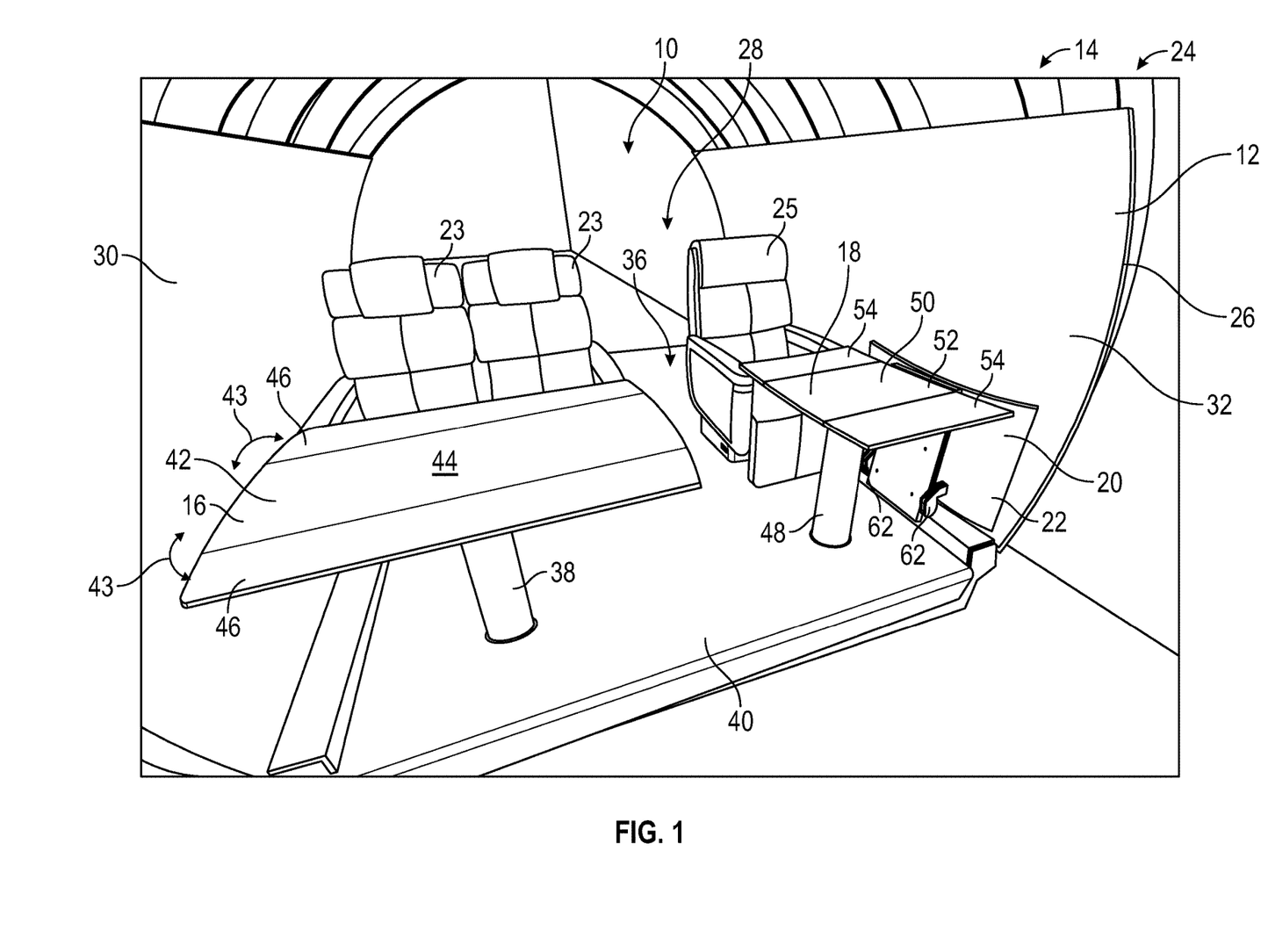
FIG. 1 illustrates a perspective view of an interior area of a vehicle section including a four place table and a two place table and various furniture items arranged therein in accordance with an exemplary embodiment.

FIG. 1 illustrates a perspective view of an interior area 10 of a section 12 of a vehicle 14 including a first table section 16 (e.g., four place table), a second table section 18 (e.g., two place table), and a third table section 20 including a leaf 22, and various furniture items 23 and 25 arranged therein in accordance with an exemplary embodiment. In the illustrated embodiment, the section 12 is a section of an aircraft 24 that includes an aircraft structure 26 surrounding a cabin area 28. The aircraft structure 26 includes sidewalls 30 and 32 and a floor 40 as a base extending therebetween.

Figure 11:
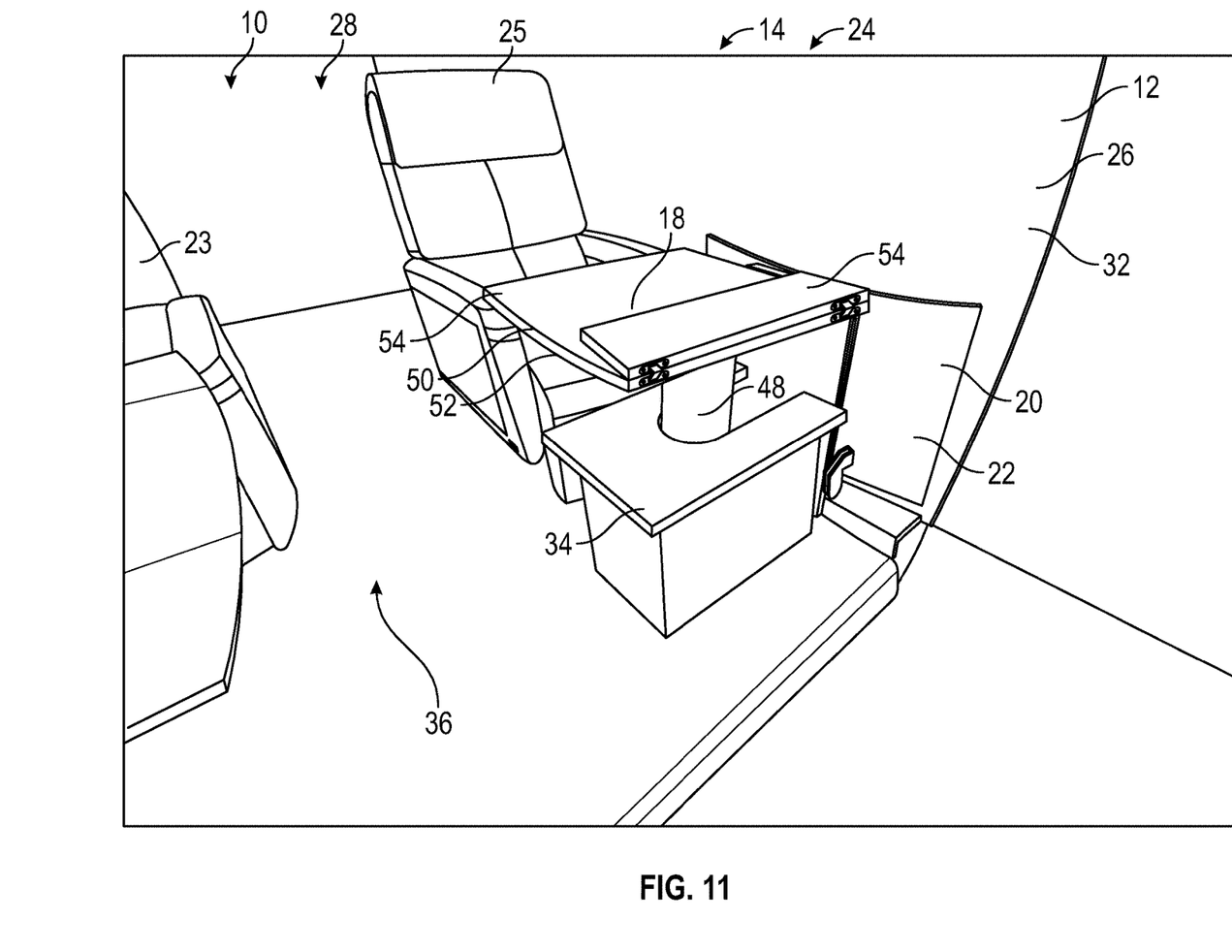
FIG. 11 illustrates a perspective view of an interior area of a vehicle section including a two place table incorporated with an ottoman cover and depicting a height of the stowed two place table in accordance with an exemplary embodiment.

Arranged in the interior area 10 are seats 23 and 25, the four place table 16, and the two place table 18 that may be incorporated with an ottoman (shown in FIGS. 11-12) or trim piece that is removable. An aisleway 36 extends longitudinally through the interior area 10 separating the two place table 18 from the four place table 16. Although only two seats 23 are shown on one side of the four place table 16 and only one seat 25 is shown on one side of the two place table 18 to provide a clearer view of the tables 16 and 18, it is to be understood that two additional seats 23 are positioned on an opposite side of the four place table 16 and an additional seat 25 is position on an opposite side of the two place table 18, respectively.

The four place table 16 includes a pedestal 38 or other support structure that extends upward from the floor 40 and supports a tabletop 42. The tabletop 42 includes in intermediate tabletop subsection 44 that is disposed between leaves 46. The leaves 46 are hingedly coupled to opposing edges of the intermediate tabletop subsection 44 to move (along double-headed arrows 43) between extended or unfolded positions as illustrated in FIG. 1 and retracted or folded positions in which the leaves 46 are disposed on or overlying the intermediate tabletop subsection 44.

Figure 2:
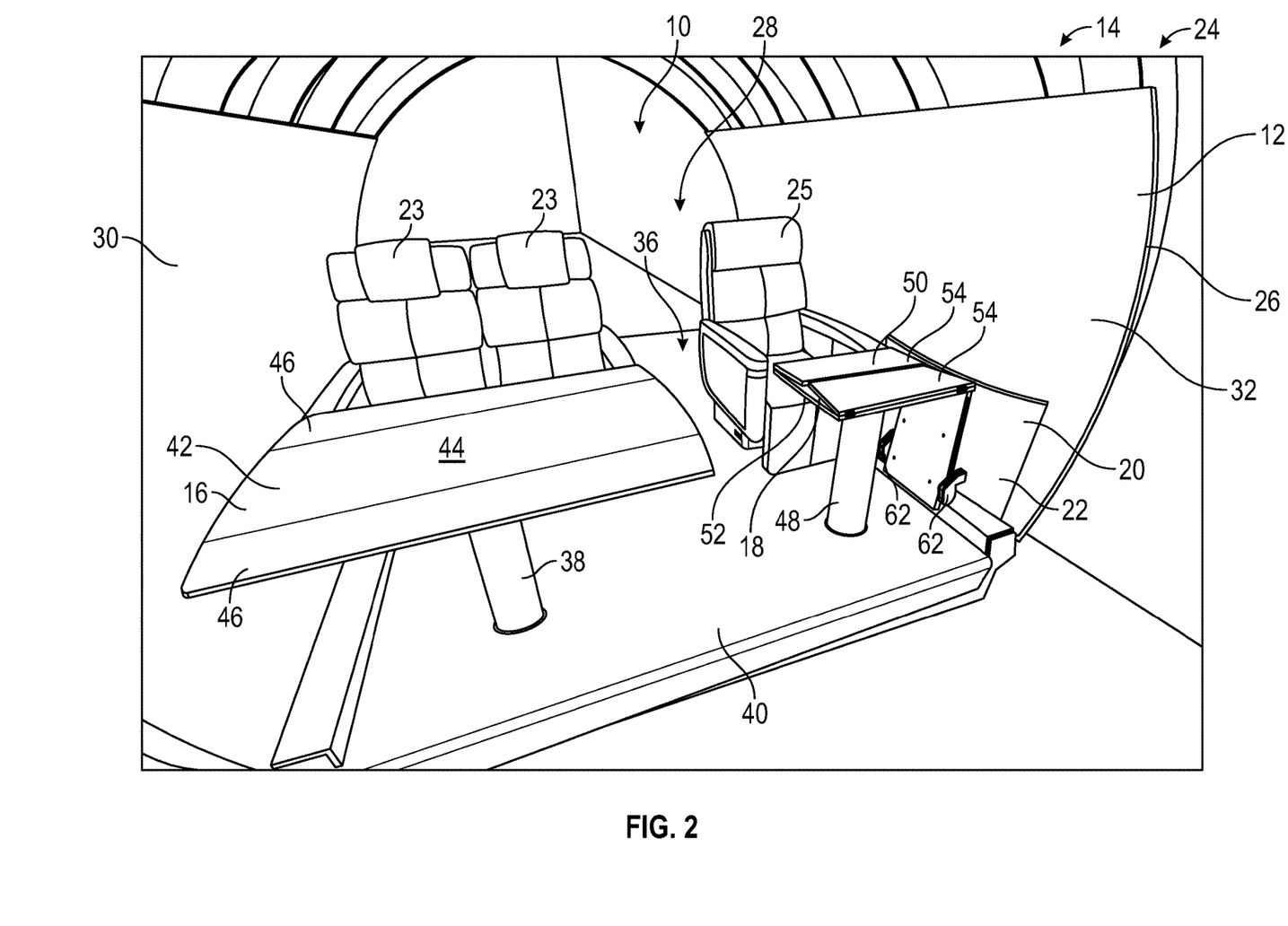
FIG. 2 illustrates a perspective view of an interior area of a vehicle section including a four place table and a two place table in a stowed position in accordance with an exemplary embodiment.
Figure 3:
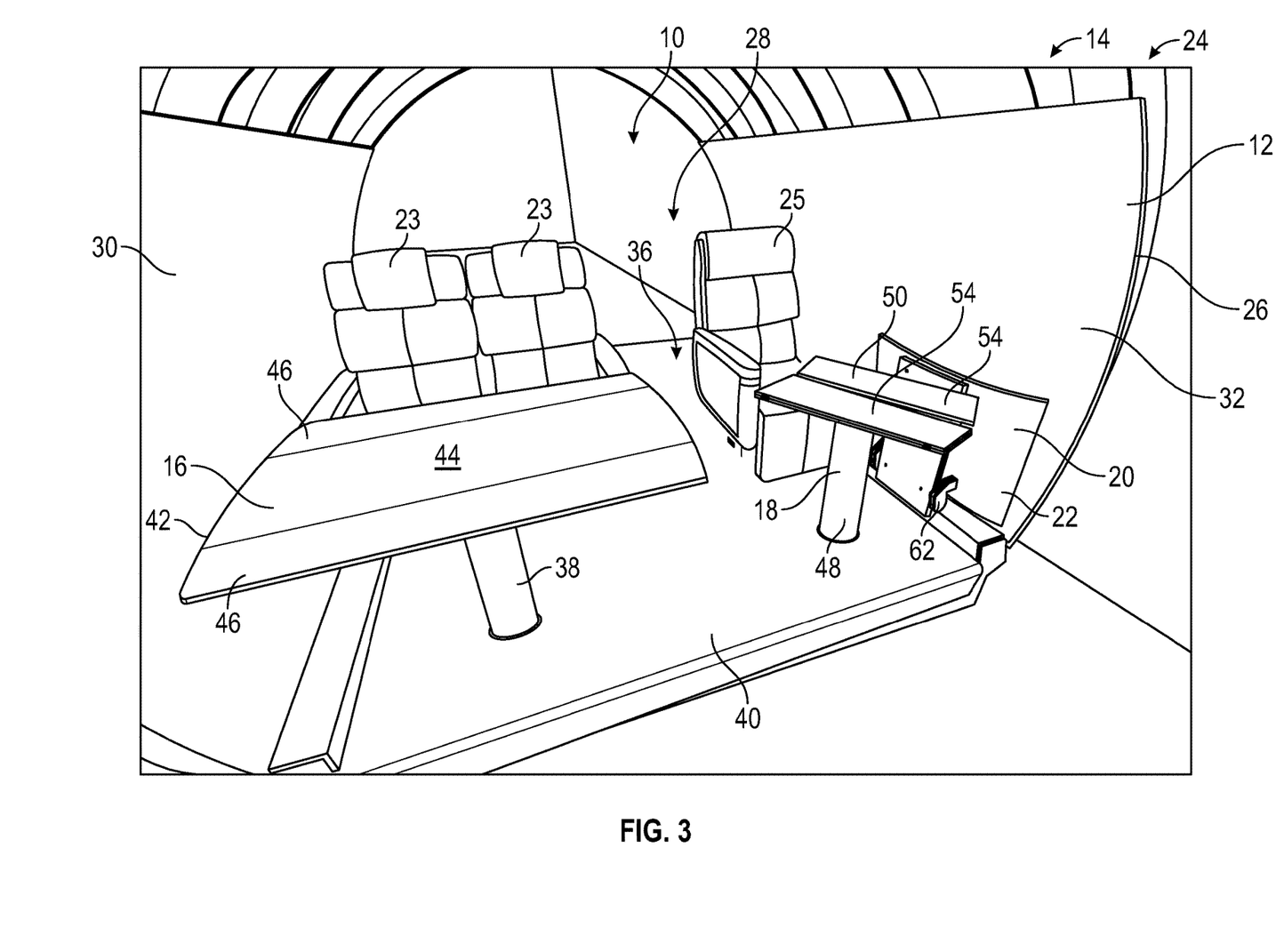
FIG. 3 illustrates a perspective view of an interior area of a vehicle section including a four place table and a two place table in a stowed, partially rotated position in accordance with an exemplary embodiment.
Figure 4:
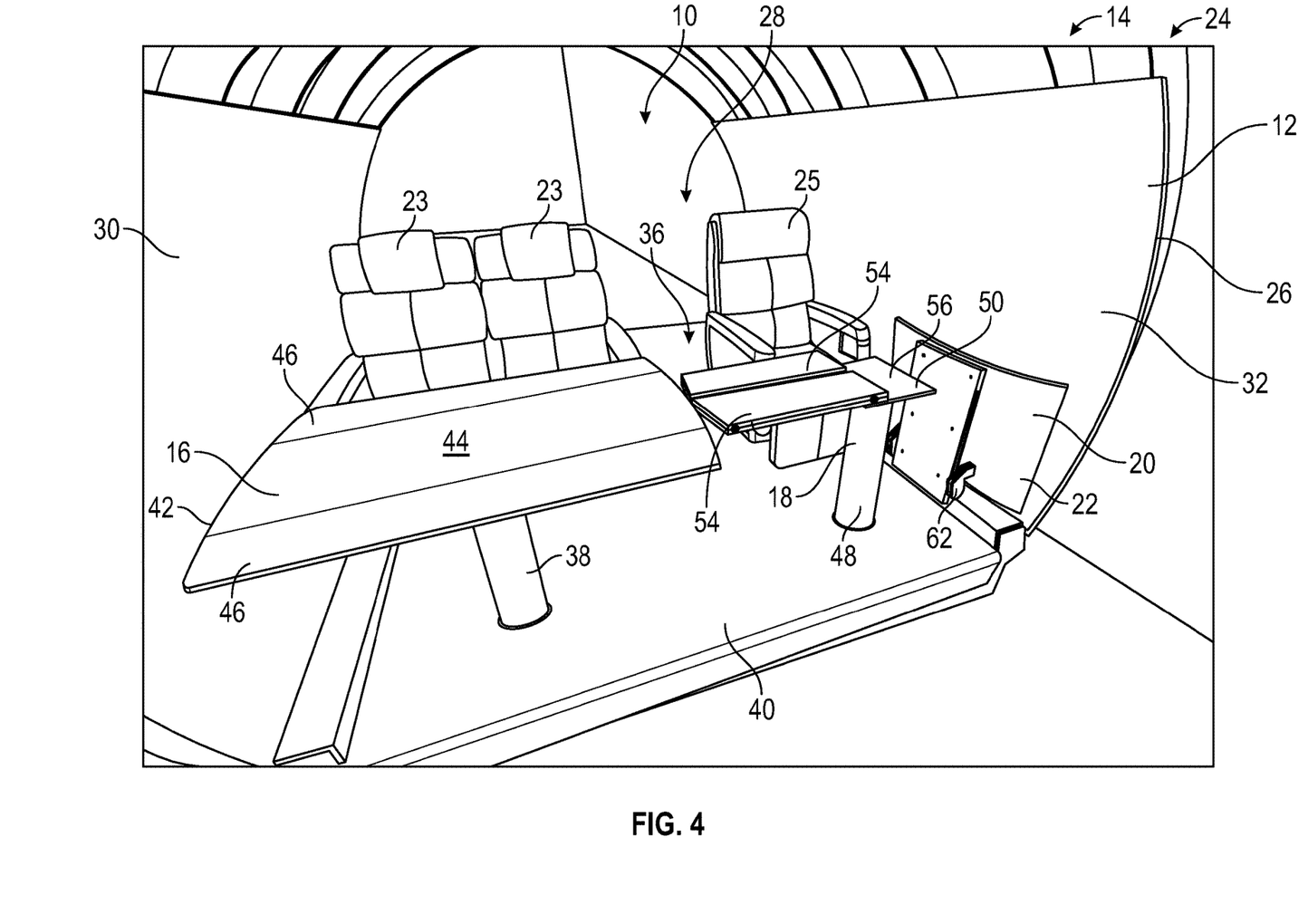
FIG. 4 illustrates a perspective view of an interior area of a vehicle section including a four place table and a two place table in a rotated, partially deployed deployment position in accordance with an exemplary embodiment.
Figure 5:
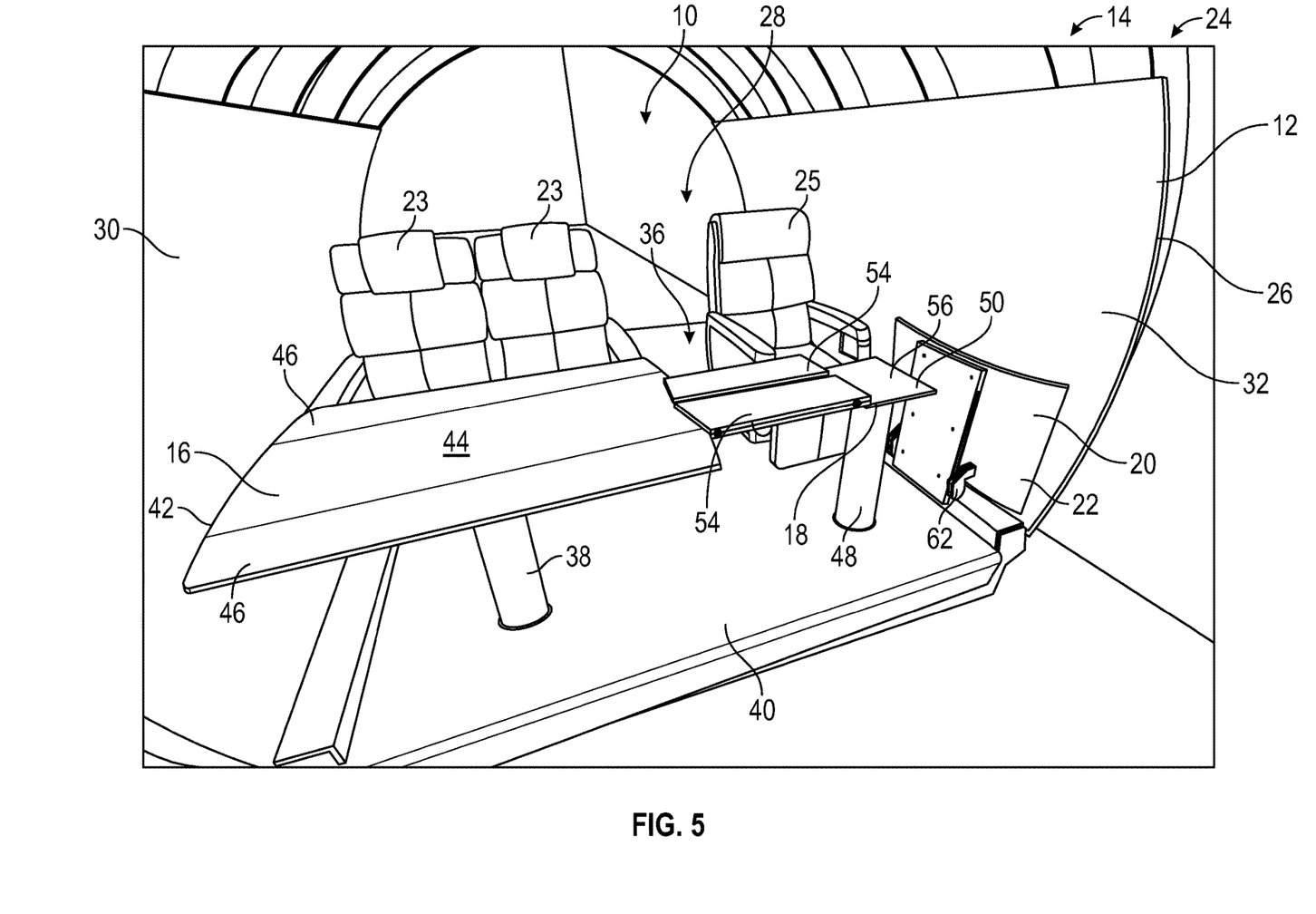
FIG. 5 illustrates a perspective view of an interior area of a vehicle section including a four place table and a two place table at further advanced deployment position in accordance with an exemplary embodiment.

Referring to FIGS. 1-2 and 11-12, likewise, the two place table 18 includes a pedestal 48 or other support structure that extends upward from the floor 40 and supports a tabletop 50. When the ottoman 34 or trim piece is removed as shown in FIGS. 1-2, the pedestal 48 of the two place table 18 is fully exposed. When the ottoman 34 or trim piece is position below the tabletop 50, the ottoman 34 or trim piece substantially covers a lower portion of the pedestal 48.

Figure 12:
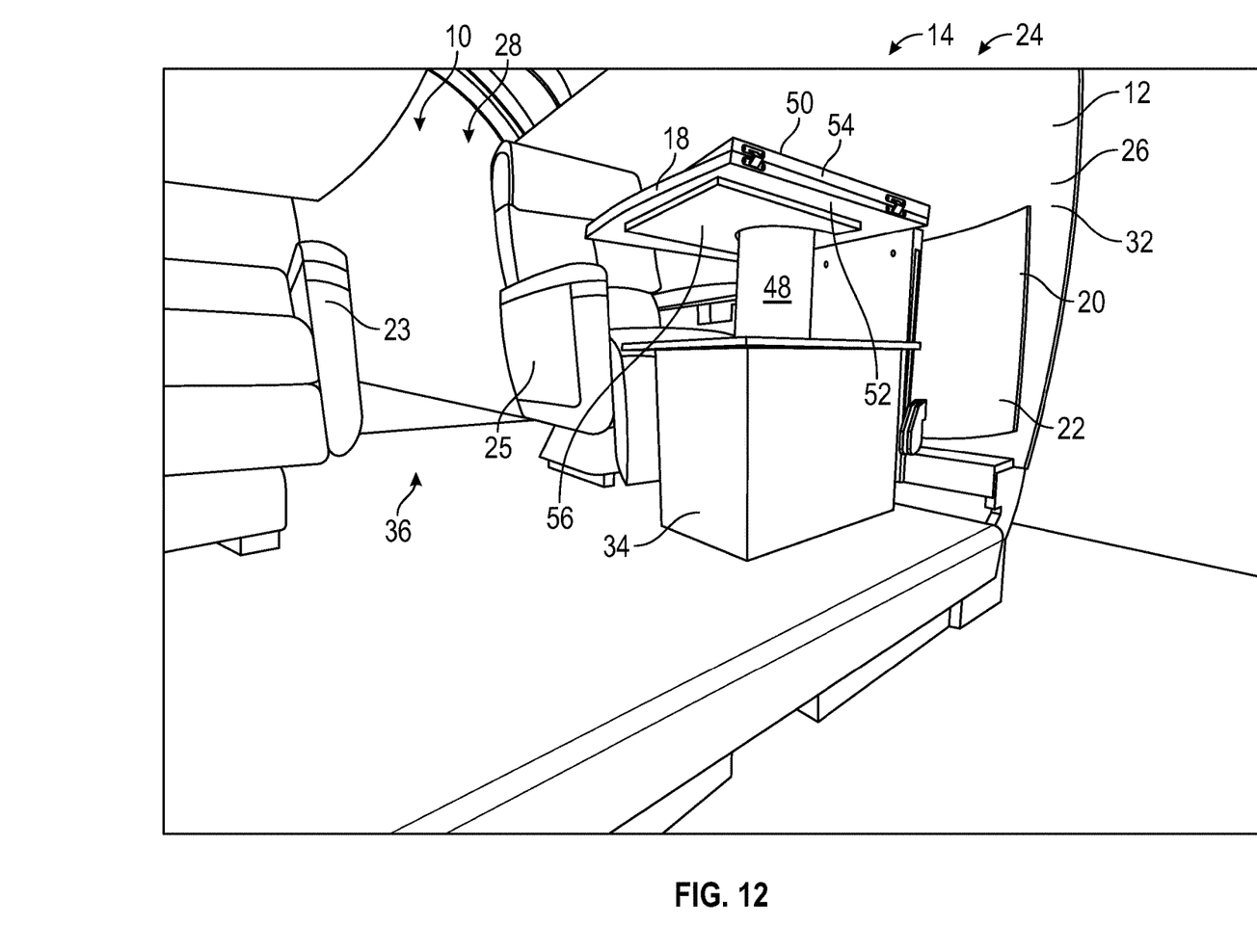
FIG. 12 illustrates a perspective bottom, side view of an interior area of a vehicle section including a two place table with an ottoman cover and depicting a height of the stowed two place table in accordance with an exemplary embodiment.

The tabletop 50 includes an intermediate tabletop subsection 52 that is disposed between leaves 54. The leaves 54 are hingedly coupled to opposing edges of the intermediate tabletop subsection 52 to move between extended or unfolded positions as illustrated in FIG. 1 and retracted or folded positions in which the leaves 54 are disposed on or overlying the intermediate tabletop subsection 52 as illustrated in FIGS. 2 and 12. As will be discussed in further detail below, the tabletop 50 further includes a tabletop base 56 that is disposed under and supports the intermediate tabletop subsection 52.

Figure 10:
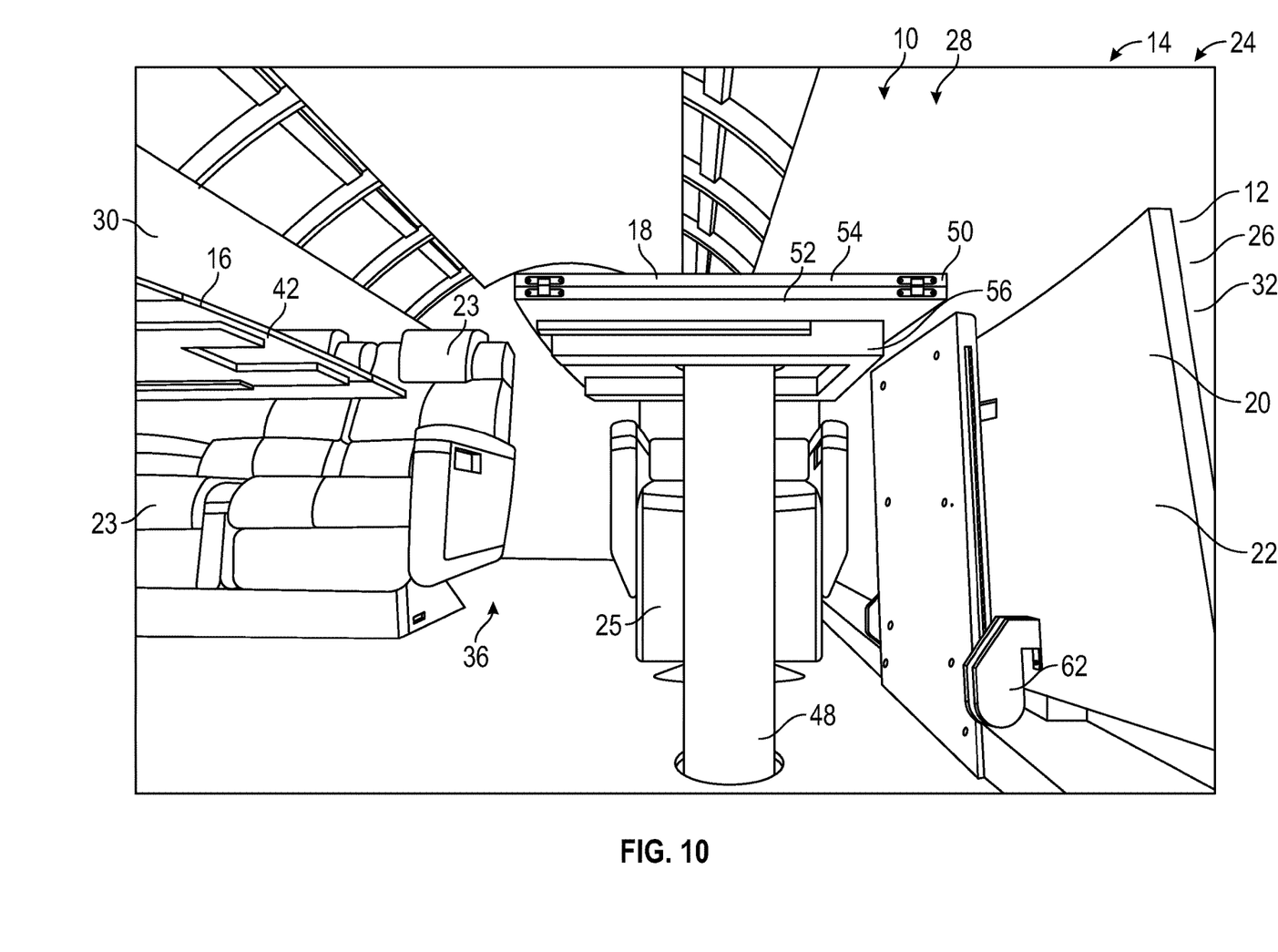
FIG. 10 illustrates a perspective bottom, side view of an interior area of a vehicle section including a two place table in accordance with an exemplary embodiment.

In an exemplary embodiment, the tabletop 50 is disposed on and moveably coupled to the pedestal 48. As illustrated in FIGS. 2 and 10, the two place table 18 is in the stowed, retracted position in which the tabletop 50 is directly over the pedestal 48 and disposed away from the aisleway 36 with the leaves 54 folded and overlying the intermediate tabletop subsection 52, which overlies and covers the tabletop base 56. In an exemplary embodiment, the two place table 18 in the stowed, retracted position has a relatively small profile, allowing for easy ingress and egress about the two place table 18 and through the aisleway 36.

Figure 6:
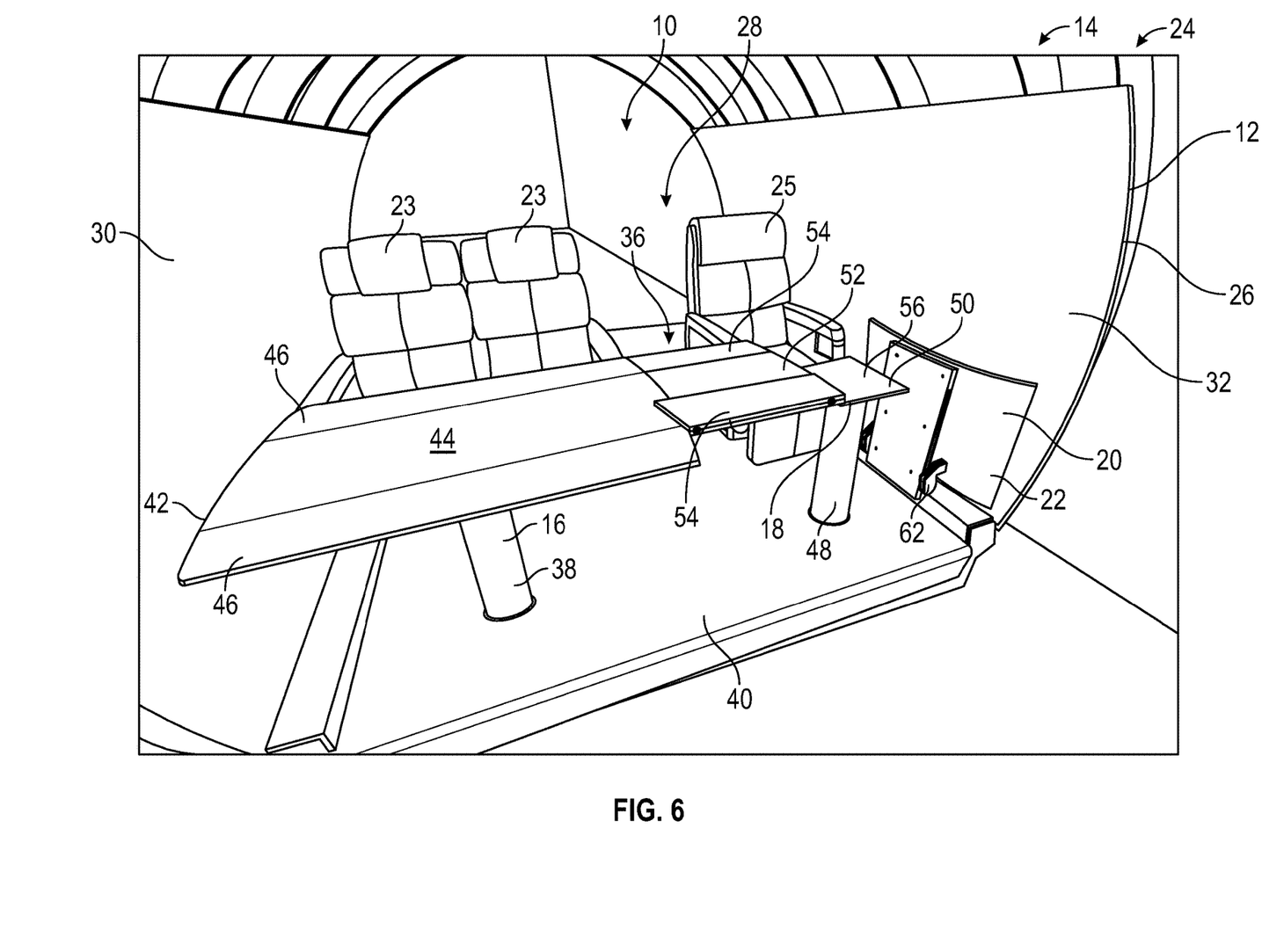
FIG. 6 illustrates a perspective view of an interior area of a vehicle section including a four place table and a two place table at further advanced deployment position in accordance with an exemplary embodiment.
Figure 7:
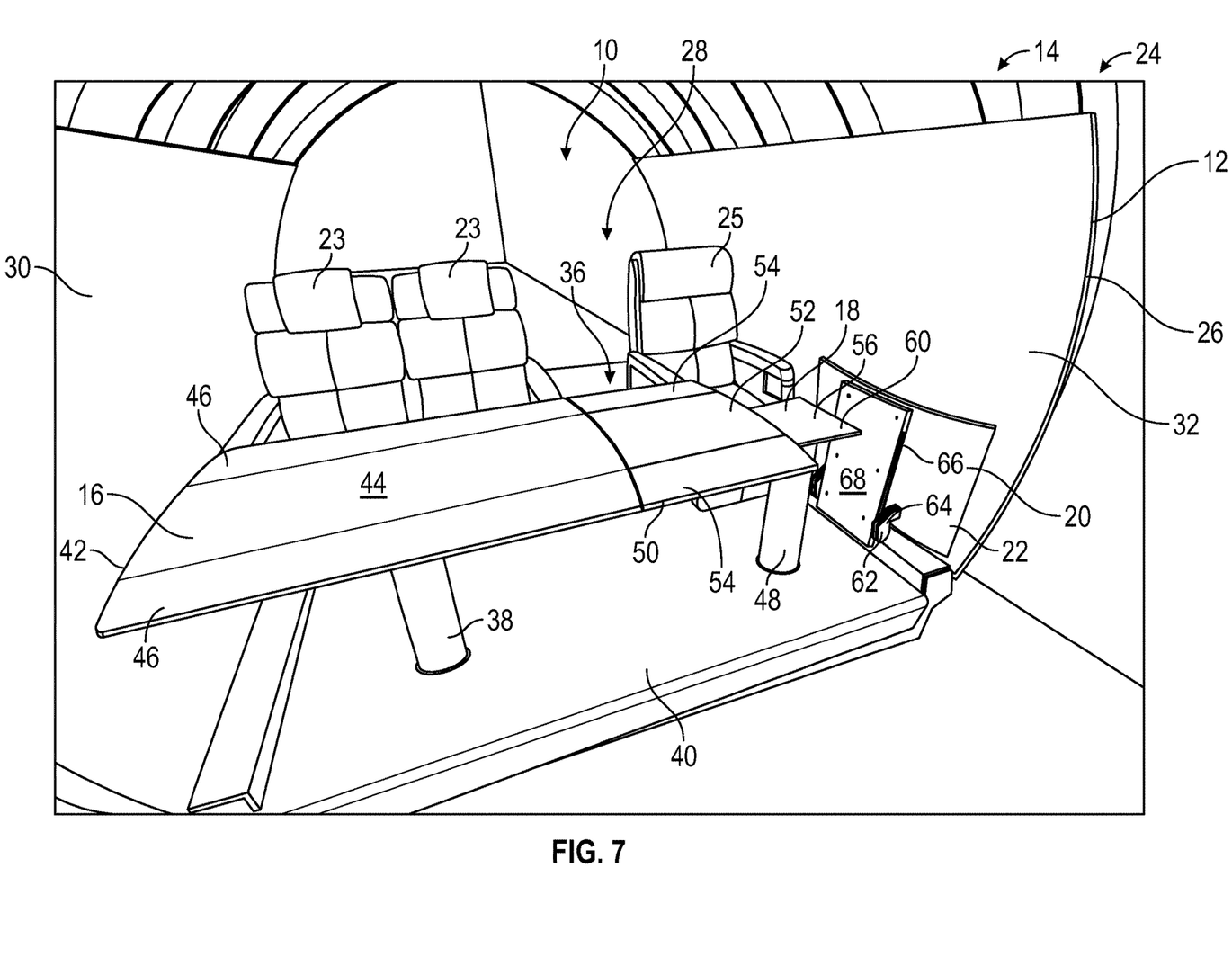
FIG. 7 illustrates a perspective view of an interior area of a vehicle section including a four place table and a two place table at further advanced deployment position in accordance with an exemplary embodiment.

Referring also to FIGS. 3-5 and 9, in an exemplary embodiment, when a multi-place dining table 58 (shown in FIG. 9) is desired, the ottoman 34 if present is removed or taken away, and the tabletop 50 is moved while the pedestal 48 remains fixed. As illustrated, the tabletop 50 is moved from the stowed, retracted position by rotating the tabletop 50 including the intermediate tabletop subsection 52, the leaves 54, and the tabletop base 56 about the longitudinal axis of the pedestal 48. Next, the intermediate tabletop subsection 52 and the leaves 54 are tracked or otherwise translated relative to the tabletop base 56, which remains with or proximate the pedestal 48, across the aisleway 36 towards the tabletop 42 of the four place table 16. In an exemplary embodiment, the tabletop 50 is rotated about 180° about the longitudinal axis of the pedestal 48 prior to translating the intermediate tabletop subsection 52 and the leaves 54. As illustrated in FIGS. 6-7, with the tabletop 50 of the two place table 18 deployed, the intermediate tabletop subsection 52 engages or otherwise couples to the intermediate tabletop subsection 44 of the four place table 16, and the leaves 54 are unfolded. Further, the portion of the tabletop base 56 that is disposed about and/or overlying the pedestal 48 is now exposed as the intermediate tabletop subsection 52 has been translated towards the tabletop 42. As illustrated in FIG. 7, the tabletop 50 is in the deployed, extended position extending across the aisleway 36 and engaging or otherwise coupling to the distal edge portion of the tabletop 42, thereby securing the tabletops 42 and 50 of the four place and two place tables 16 and 18 together, for example substantially horizontally at the same height or level. Notably, the leaves 54 of the two place table 18 may be unfolded before, during, or after translating the intermediate tabletop subsection 52 and the leaves 54 to the tabletop 42 of the four place table 16.

Figure 8:
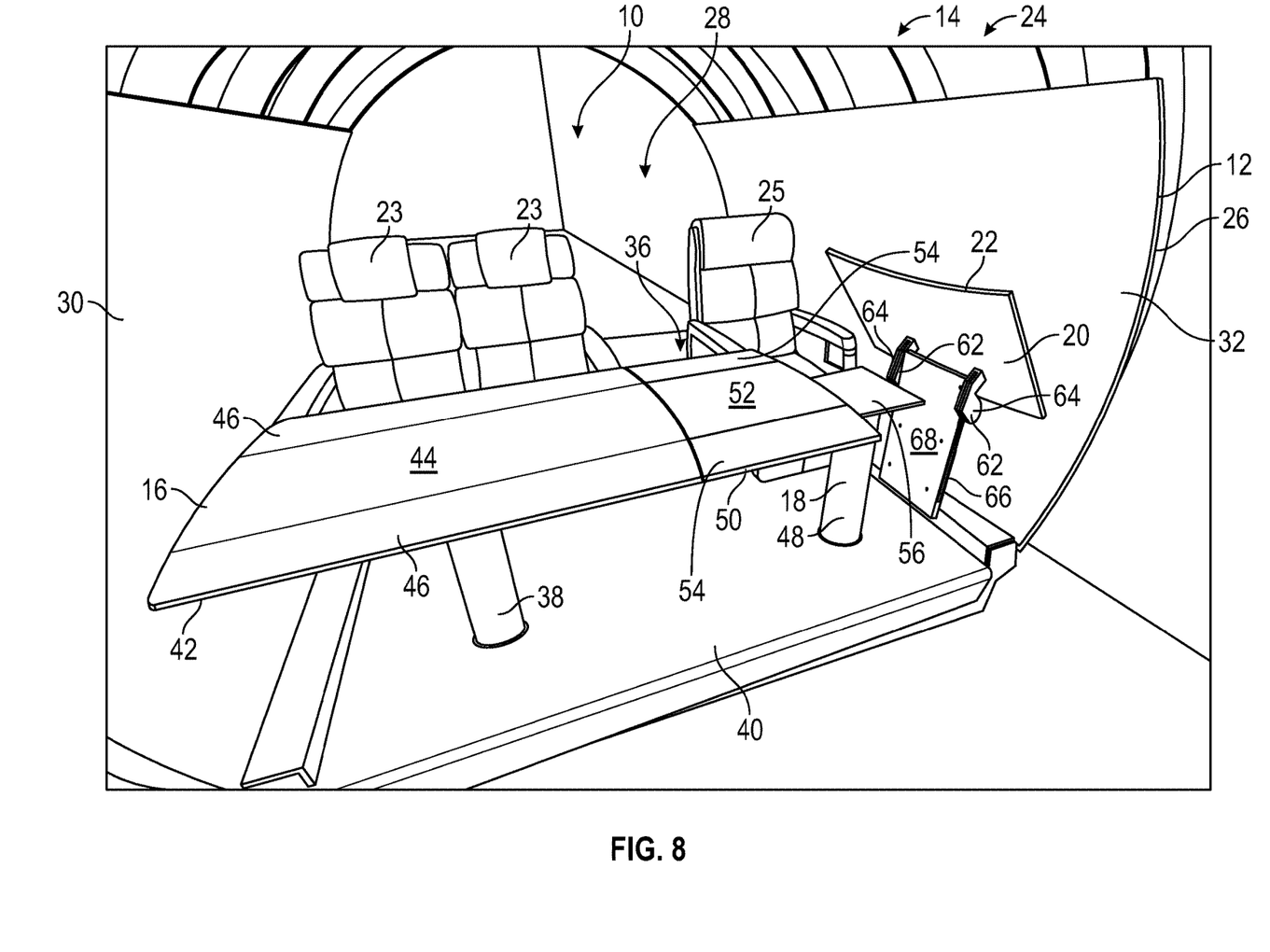
FIG. 8 illustrates a perspective view of an interior area of a vehicle section including a four place table and a two place table in deployed positions and a leaf being deployed from a side area of the aircraft section in accordance with an exemplary embodiment.
Figure 9:
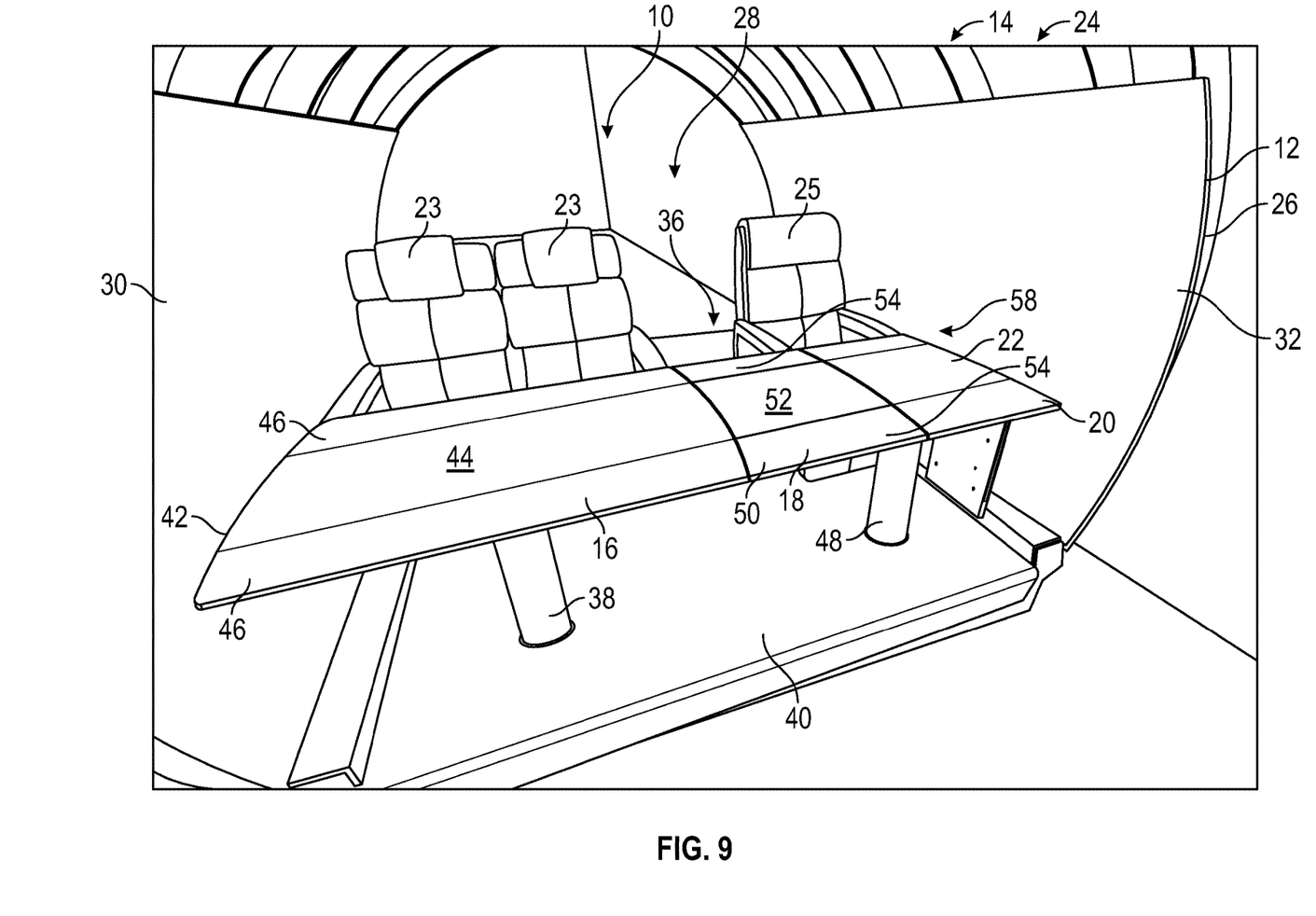
FIG. 9 illustrates a perspective view of an interior area of a vehicle section including a four place table, a two place table, and a leaf in deployed positions that together form a six place dining table in accordance with an exemplary embodiment.

Referring to FIGS. 7-9, the leaf 22 is stored vertically in a retracted position adjacent to the sidewall 32 and proximate the two place table 18. In an exemplary embodiment, the leaf 22 is movable between the retracted position and a deployed position on linkages 62 that are configured to accommodate such movement. In an exemplary embodiment, the linkages 62 include cams 64 that ride along tracks 66 that are formed in a panel 68 that is disposed vertically adjacent to and spaced apart from the sidewall 32. As illustrated in FIG. 9, in the deployed position, the leaf 22 is disposed horizontally with one end supported by the linkages 62 and/or the panel 68, and the other end disposed on and supported by the tabletop base 56. In an exemplary embodiment, with the leaf 22 engaging or otherwise coupling to the deployed, extended tabletop 50, and the deployed, extended tabletop 50 engaging or otherwise coupling to tabletop 42, together they form the multi-place dining table 58, for example as a seemingly integral six place dining table.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A vehicle comprising:
a vehicle structure having a first sidewall and a second sidewall that are spaced apart from each other, and a floor disposed therebetween, wherein the first sidewall, the second sidewall, and the floor at least partially surround an interior area that has an aisleway; and
a multi-place dining table disposed in the interior area, the multi-place dining table comprising:
a first table section disposed between the first sidewall and the aisleway and including a first tabletop; and
a second table section disposed between the second sidewall and the aisleway and including a second tabletop, wherein the second tabletop is configured to move between a stowed position and a deployed position, wherein when the second tabletop is in the stowed position, the first and second tabletops are spaced apart from each other by at least the aisleway, and wherein when the second tabletop is in the deployed position, the second tabletop extends across the aisleway and is coupled to the first tabletop.

2. The vehicle of claim 1, wherein the first table section further includes a first support structure that extends upwardly from the floor and supports the first tabletop.

3. The vehicle of claim 1, wherein the second table section further includes a second support structure that extends upwardly from the floor and supports the second tabletop.

4. The vehicle of claim 3, wherein the second tabletop is movably coupled to the second support structure.

5. The vehicle of claim 4, wherein the second tabletop includes an intermediate tabletop subsection and a tabletop base that that is disposed under and supports the intermediate tabletop subsection.

6. The vehicle of claim 5, wherein the intermediate tabletop subsection is movably coupled to the tabletop base, wherein when the second tabletop is in the stowed position, the intermediate tabletop subsection overlies and covers the tabletop base, and wherein when the second tabletop is in the deployed position, the second tabletop extends across the aisleway and is coupled to the first tabletop and at least a portion of the tabletop base is exposed that is proximate to and/or overlying the second support structure.

7. The vehicle of claim 6, wherein the second tabletop is configured to move from the stowed position to the deployed position by rotating the second tabletop including rotating the intermediate tabletop subsection with the tabletop base, and translating the intermediate tabletop subsection relative to the tabletop base across the aisleway towards the first tabletop.

8. The vehicle of claim 7, wherein the second tabletop is configured to be rotated about 180°.

9. The vehicle of claim 6, further comprising a third table section that includes a leaf that is stored vertically in a retracted leaf position adjacent to the second sidewall proximate to the second table section, wherein the leaf is movable between the retracted leaf position and a deployed leaf position, wherein when the second tabletop is in the deployed position and the leaf is in the deployed leaf position, the leaf is disposed horizontally with an end portion supported by the tabletop base and is coupled to the intermediate tabletop subsection.

10. The vehicle of claim 9, wherein the third table section includes a linkage that is coupled to the leaf and is configured to guide movement of the leaf between the retracted leaf position and the deployed leaf position.

11. The vehicle of claim 10, wherein the linkage is configured as a cam-track arrangement.

12. The vehicle of claim 9, wherein the second tabletop further includes at least one leaf that is hingedly coupled to the intermediate tabletop subsection to move from a retracted position and an extended position, wherein the at least one leaf in the retracted position overlies the intermediate tabletop subsection and in the extended position extends horizontally outward from the intermediate tabletop subsection.

13. The vehicle of claim 12, wherein when the second tabletop is in the deployed position, the at least one leaf is in the extended position and is coupled to the first tabletop.

14. The vehicle of claim 13, wherein when the second tabletop is in the deployed position and the leaf of the third table section is in the deployed leaf position, the leaf of the third table section is coupled to the at least one leaf of the second tabletop.

15. The vehicle of claim 13, wherein when the second tabletop is in the stowed position, the at least one leaf is in one of the retracted position and the extended position and is spaced apart from the first tabletop by at least the aisleway.

16. The vehicle of claim 1, wherein the first table section is a four place table.

17. The vehicle of claim 1, wherein the second table section is a two place table.

18. The vehicle of claim 1, wherein the multi-placed dining table is a six place dining table.

19. The vehicle of claim 1, wherein the vehicle is an aircraft.

20. A multi-place dining table for a vehicle that includes a vehicle structure having a first sidewall and a second sidewall that are spaced apart from each other and a floor disposed therebetween, wherein the first sidewall, the second sidewall, and the floor at least partially surround an interior area that has an aisleway, the multi-place dining table comprising:

a first table section configured to be disposed between the first sidewall and the aisleway, and wherein the first table section includes a first tabletop; and a second table section configured to be disposed between the second sidewall and the aisleway, wherein the second table section includes a second tabletop, wherein the second tabletop is configured to move between a stowed position and a deployed position, wherein when the second tabletop is in the stowed position, the first and second tabletops are spaced apart from each other by at least the aisleway, and wherein when the second tabletop is in the deployed position, the second tabletop extends across the aisleway and is coupled to the first tabletop.

\* \* \* \* \*